UNITED STATES PATENT OFFICE.

JOHN OLSON AND DAVID D. JAMES, OF FORT ATKINSON, WISCONSIN, ASSIGNORS TO JAMES MANUFACTURING COMPANY, OF FORT ATKINSON, WISCONSIN, A CORPORATION OF WISCONSIN.

LITTER-CARRIER.

1,209,642.  Specification of Letters Patent.  Patented Dec. 19, 1916.

Application filed October 11, 1913. Serial No. 794,619.

*To all whom it may concern:*

Be it known that we, JOHN OLSON and DAVID D. JAMES, citizens of the United States, residing at Fort Atkinson, county of Jefferson, and State of Wisconsin, have invented new and useful Improvements in Litter-Carriers, of which the following is a specification.

Our invention relates to improvements in litter carriers.

It pertains, among other things, 1st—to the mechanism for holding the litter receptacle in an upright position upon its pivotal supports as the same is being filled and moved beneath its supporting track; 2nd—to the mechanism for automatically releasing the litter receptacle above the place of discharging its contents; and 3rd—to the construction of the track from which the litter carrier is supported.

Our invention is further explained by reference to the accompanying drawings, in which—

Figure 1:
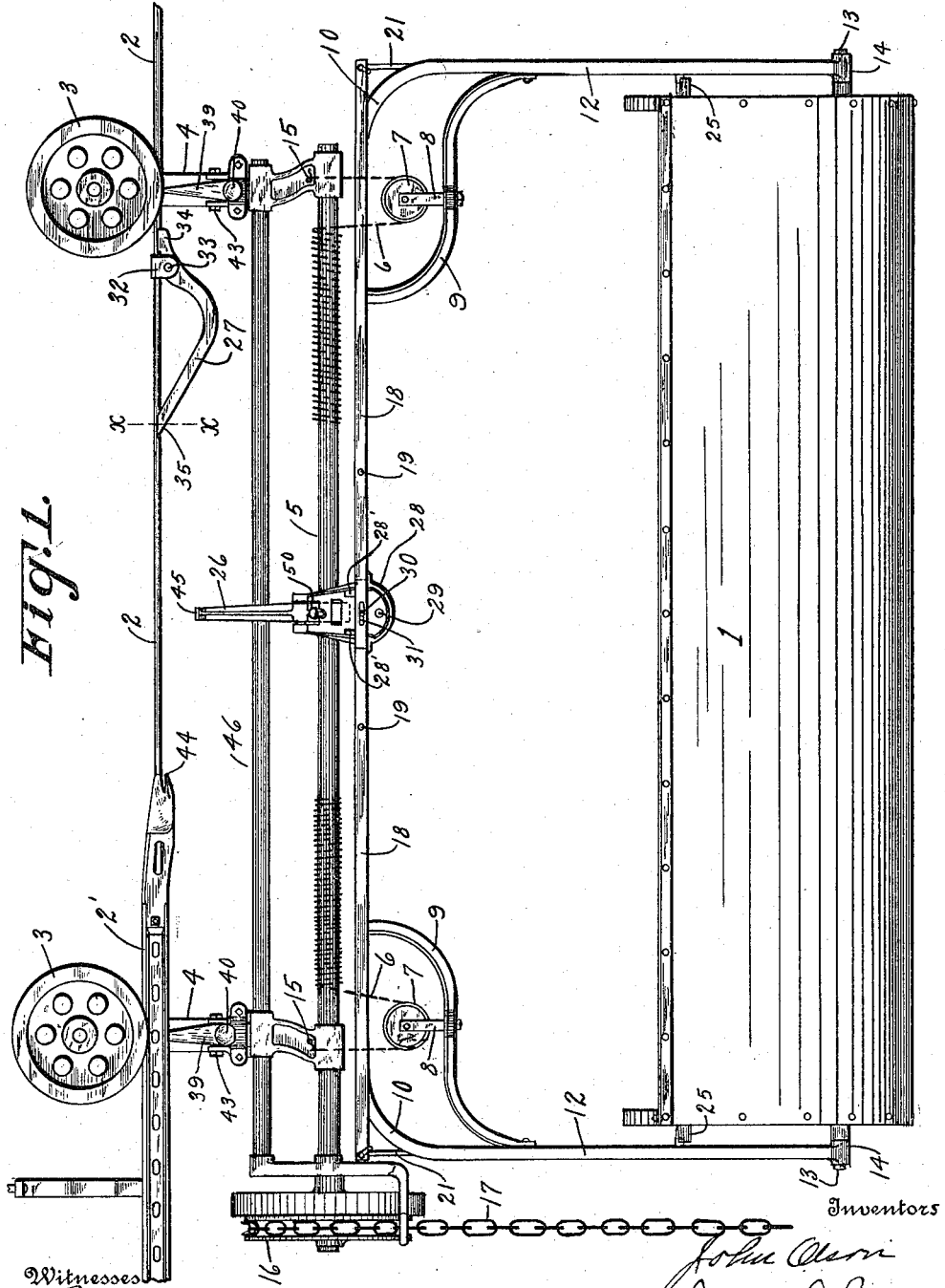
Figure 2:
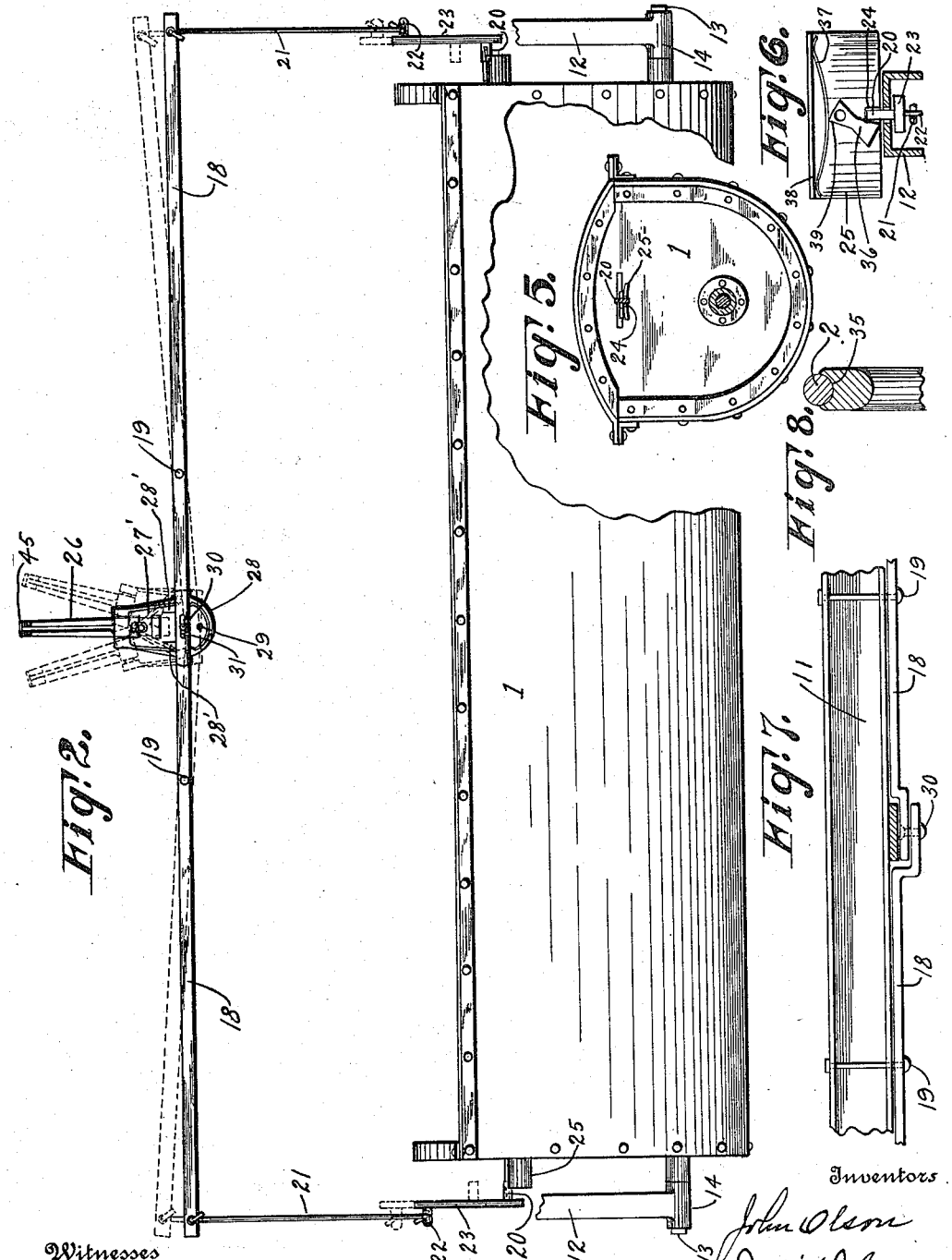
Figure 3:
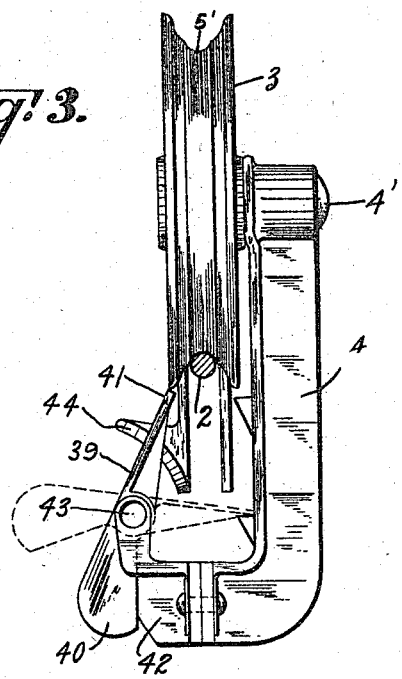
Figure 4:
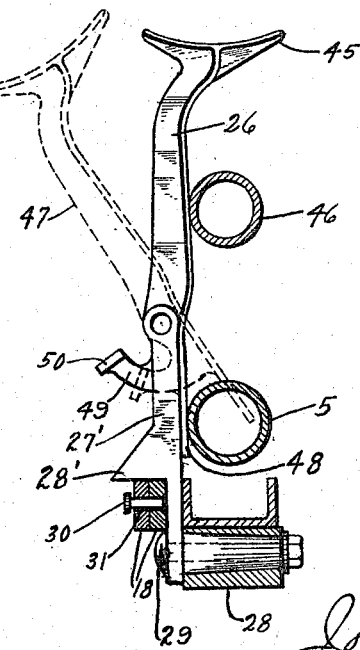

Figure 1 is a front view of the litter carrier and its supporting tracks as connected together. Fig. 2 is a front view of the litter receptacle and some of the coöperating parts of the carrier removed from its supporting track. Fig. 3 is a side view of one of the carrier supporting rollers and bracket showing the mechanism for closing the space between one side of the roller and such supporting bracket. Fig. 4 is a side view of the arm for automatically releasing the receptacle holding mechanism. Fig. 5 is an end view of the litter receptacle removed from its support. Fig. 6 is a detailed view, part in horizontal section, of one of the devices for locking the respective ends of the receptacle and retaining such receptacle in an upright position. Fig. 7 is a plan view showing one end of the pivotally connected levers employed for automatically releasing the litter receptacle when supported in its upright position, and Fig. 8 is a detailed view drawn on line *x—x* of Fig. 1.

Like parts are identified by the same reference numerals throughout the several views.

1 is a litter receptacle.

2 is a track from which the litter receptacle 1 is suspended through the rollers 3, 3, hangers 4, 4, revoluble shaft 5, flexible members 6, 6, pulleys 7, 7, hangers 8, 8, brace members 9, 9, bail 10 comprising a horizontal member 11, vertical members 12, 12, trunnions 13, 13, which trunnions 13, 13 are pivotally connected with the lower ends of the vertical members 12, 12 through the cylindrical collars 14. The flexible members 6, 6 are permanently connected at one end to the hangers 4, 4 at a fixed point 15 and pass from there beneath the pulleys 7, 7 and thence around the revoluble shaft 5. The receptacle 1, together with the bail and the other coöperating parts, is adapted to be raised by revolving the shaft 5 in one direction and lowered by revolving said shaft in the opposite direction. Shaft 5 is provided at one end with a sprocket wheel 16 over which is suspended an operating chain 17. The parts thus far described are substantially of ordinary construction and need not herein be further described.

To the side of the bail 10 are connected two levers 18, 18 by pivotal bolts 19, 19 and the outer ends of said levers 18, 18 are connected with locking lugs 20, 20 through the links 21, 21, lugs 22, 22 and vertical sliding bars 23, 23. The bars 23 have sliding bearings between the two opposing sides of the vertical members 12 of the bail. Thus it is obvious that when the receptacle 1 is in an upright position, as shown in Figs. 1 and 2, the lugs 20, 20 are engaged in the recess 24, 24 of the laterally projecting brackets 25, 25, whereby the receptacle 1 is locked and retained in its upright position, as shown in Figs. 1, 2 and 5. When, however, the lugs 20 are raised from the position shown in Fig. 2 to that indicated by dotted lines in said figure, the lugs 20 are disengaged from the brackets 25, whereby the receptacle 1 is released and free to turn a half revolution on its supporting trunnions 13, whereby its contents is automatically discharged. The lugs 20 are disengaged from the recess 24 of the bracket 25 by the action of the levers 18 as such levers are thrown from the position shown in Fig. 2 to that indicated by dotted lines in said figure. When the vertical arm 26 is in the vertical position, shown in Fig. 2, the receptacle will be retained in its upright position, as shown in said figure. When, however, said arm 26 is inclined from the vertical to either position indicated by dotted lines, in said figure, the outer ends of said levers 18 will be raised to the position indicated by such dotted lines, whereby the receptacle 1 will be released as stated and its contents will be discharged. The vertical arm 26 is inclined toward either the right or left, according to the direction the receptacle is moving by contact with the bracket 27 as the litter carrier is moved along the track 2.

Assuming that the carrier is being moved toward the right, as shown in Fig. 1, the vertical arm 26 would be inclined toward the left, as indicated by the dotted lines in Fig. 2. When, however, said carrier is moved in the opposite direction, said arm 26 would be inclined toward the right as indicated by the dotted lines in said Fig. 2. The sides of the member 28' are adapted to bear upon the upper sides of both levers 18, whereby as said arm 26 is inclined in either direction the inner ends of said levers 18 will be inclined downwardly, as indicated by dotted lines in Fig. 2, whereby their outer ends will be thrown upwardly from the position shown to that indicated by dotted lines, when the receptacle 1 will be disengaged from the locking mechanism as previously described. The vertical arm 26 is pivotally supported from a stationary member 28 by pivotal bolt 29 upon which pivotal bolt said vertical arm is supported as it is inclined toward the right and left. The contiguous ends of the levers 18 are pivotally connected together by the pin 30. Pin 30 is rigidly connected to the rear lever 18 and operates in a slot 31 formed in the front lever 18. It will be understood that the slot 31 is of such length as to permit the required downward movement to the connected ends of said levers as the same are acted upon by the vertical arm 26.

In view of the fact that the point of discharge of the contents of the receptacle 1 beneath the track 2 may be changed from time to time, as the litter accumulates beneath said track, it becomes necessary to shift the bracket 27 along said track from one point to another, whereby the arm 26 will be acted upon at different points along the track as circumstances may require. In view of the fact that it becomes necessary to change the location of the bracket 27, we have provided a simple and convenient means for locking the same to the track at different points. The bracket 27 is pivotally connected with the track inclosing loop 32 by a pivotal bolt 33 and said bracket is provided at one end with a lug 34 which is adapted to engage beneath the under side of said track and at its opposite end with a groove 35 which is also adapted to engage beneath the under side of said track. It will be obvious that by springing downward the end of the bracket 27 it is brought out of contact with the track and the lug 34 will be disengaged from said track, whereby the loop 32 and the bracket 27 connected therewith will be free to be moved longitudinally on said track to any desired point. When the bracket 27 has been brought to the desired point, the free end 35 of said bracket is again sprung downwardly beneath the lower side of said track 2 when it is caused to spring back until the groove 35 engages the lower side of said track, as shown in Fig. 8, whereby said bracket 27 is again securely retained in place.

In view of the fact that it sometimes occurs that the receptacle 1 will not be inverted the instant the lugs 20 are released from the recess 24, it becomes necessary to close the upper side of said recess to prevent the lugs 20 from dropping back into them as they might otherwise do after the first contact of the arm 26 with the bracket 27 and to prevent the lugs 20 from dropping back into the recess 24, we have provided a stop button 36 which is normally retained above said recess by the recoil of the spring 37. Spring 37 bears at its respective ends against the vertical plate 38 and at its center of one of the corners 39 against said stop button, whereby the instant said lug 20 is raised above said stop button it is acted upon by said spring 37 and instantaneously thrown above said recess 24, whereby the liability of said lug 20 entering said recess before said receptacle is inverted is prevented.

The roller 3 is revolubly supported from the hangers 4 by the bolt 4'. It will be understood that when the carrier is supported from the round track 2 at a distance from the bar track 2' it is sometimes liable, as the device has heretofore been constructed, to be thrown from said round track 2. By our improvement, however, we have provided a device for preventing the track 2 from being disengaged from the groove 5' of the roller which device consists in a two-armed lever 39, one arm of which is provided with a weight 40 which has a tendency to keep the opposite arm 41 in close proximity to the roller 3. The lever 39 is pivotally supported from the bracket 42 on the pivotal bolt 43, whereby the upper end 41 of said lever is normally retained in the position shown in Fig. 3 in close proximity to the periphery of the roller, whereby the liability of the roller being thrown from the track is obviated. When, however, the litter carrier is moved beneath the plate track 2', the upper end of the lever 39 is brought in contact with a curved flange 44, whereby the arm 41 of the lever is moved downwardly by contact with said flange 44 from the position shown in Fig. 3 to that indicated by dotted lines in said figure, when the upper end of said arm is free to pass beneath such flange. It will be understood that when the receptacle 1 is lowered the laterally projecting member 45 of the vertical arm 26 will be brought in contact with the stationary shaft 46 and the revoluble shaft 5 of the litter carrier, whereby said arm 26 would be thrown from the vertical position shown in Fig. 4 to that indicated by dotted lines 47 in said figure, whereby said arm 26 will be free to pass said shafts 46 and 5. When the receptacle 1 is again elevated to the position shown in Fig. 1, the arm 48 of the vertical member 26 would be brought in contact with the revoluble shaft 5 after the laterally projecting member 45 is above said arm 26, whereby said arm 26 will be again brought back to the vertical in position to contact with the bracket 27 as the litter carrier is moved longitudinally along the track 2. To prevent the arm 26 from dropping too far as it is thrown to the left from the vertical, we have provided the lower end of the same with a curved arm 49 and stop 50, which stop 50 is adapted to contact with the member 27′ as said arm 26 is thrown to the inclined position, indicated in Fig. 4 whereby the movement of said arm when thrown from the vertical is limited.

It will be observed that the arm 26 serves as an operating piece, whereby either lever 18 may be actuated to release the latch controlled thereby, and both of the arms 18 being loosely connected with each other at their meeting ends the motion of one caused by the operating piece 26 will be transmitted to the other, whereby both latches will be simultaneously retracted. Therefore, instead of having any portion of the latch or lock operating levers strike a track projection, we are enabled, by means of the operating piece, to provide a member which will yield longitudinally of the track when it strikes the track projection 27 and will progressively approach a position parallel with the inclined face of said member 27. This allows the carrier to move with progressively reduced force after the piece 26 strikes projection 27, and we thus secure a time interval for the retraction of the latches and the swinging movement of the stop button into a position where it holds the latches from returning to locking position after the operating piece has moved away from projection 27, or in case the momentum of the carrier is insufficient to prevent a retractive movement of the carrier.

The construction above described enables us to loosely connect the meeting ends of levers 18 and to so mount them upon the bail that they will not catch upon any obstruction placed upon the track intentionally or otherwise, and the lever mechanism will not get out of order, since there is nothing to cause the lever arms to spring or twist out of place. In all positions they will remain so nearly parallel with the bail, and in such proximity thereto, that there will be no danger of their catching upon anything which would violently displace them.

Having thus described our invention what we claim as new and desire to secure by Letters Patent is—

1. The combination with a litter carrier having a receptacle and a bail pivotally connected therewith at its respective ends, and adapted to permit the receptacle to tilt by gravity to an inverted position, of latch mechanism adapted to retain the receptacle in an upright position, a latch retracting lever pivotally connected with the bail, an upwardly projecting operating piece also pivoted to the bail and adapted, when tilted longitudinally of the bail, to actuate said lever to latch retracting position, said operating piece being jointed at an intermediate point, whereby its upper end may swing transversely of the bail.

2. The combination with a litter carrier having a receptacle and a bail pivotally connected therewith at its respective ends, and adapted to permit the receptacle to tilt by gravity to an inverted position, of latch mechanism adapted to retain the receptacle in an upright position, a latch retracting lever pivotally connected with the bail, an upwardly projecting operating piece also pivoted to the bail and adapted, when tilted longitudinally of the bail, to actuate said lever to latch retracting position, said operating piece being jointed at an intermediate point, whereby its upper end may swing transversely of the bail, the swinging portion of the operating piece being provided with an arm adapted to engage the bail in one position of adjustment, and retain the upper end portion against a transverse swinging movement.

3. The combination with a litter carrier having a receptacle and a bail pivotally connected therewith at its respective ends, and adapted to permit the receptacle to tilt by gravity to an inverted position, of latch mechanism adapted to retain the receptacle in an upright position, a latch retracting lever pivotally connected with the bail, an upwardly projecting operating piece also pivoted to the bail and adapted, when tilted longitudinally of the bail, to actuate said lever to latch retracting position, said operating piece being jointed at an intermediate point, whereby its upper end may swing transversely of the bail, the jointed members of said operating piece being provided with mutually engaging stops adapted to limit the transverse movement of the upper end portion.

4. In a litter carrier, the combination of a litter receptacle, provided with an end bracket, a locking lug, a projection connected with the end of said litter receptacle adjacent to the bracket, and provided with a recess, a stop pivotally connected with said bracket above said recess, a spring adapted to normally retain said stop in a position covering said recess, said stop being adapted when in normal position to prevent said locking lug from entering said recess.

5. In a litter carrier, the combination with a track having a projection, of a litter receptacle, a bail pivotally connected with the receptacle and provided with a movable member adapted to engage the track projection when the receptacle is being supported and conveyed along the track, latch mechanism adapted in one position to hold the receptacle in an upright position, connections between said movable member and the latch mechanism adapted to retract the latter when said member is actuated by said track projection, a relatively quick moving stop adapted to automatically move into the path of the latch mechanism when retracted, to prevent the same from retracting to holding position.

6. In a litter carrier, the combination with an overhead track, a tilting receptacle provided with a bail, latch mechanism adapted to prevent the receptacle from tilting when in latching position, an operating piece carried by the bail, a set of levers also carried by the bail and operatively connected with said latch mechanism, an operating piece for the transmission of motion, and means for permitting the upper portion of the operating piece to swing transversely of the bail without actuating the latch mechanism.

In testimony whereof we affix our signatures in the presence of two witnesses.

JOHN OLSON.
DAVID D. JAMES.

Witnesses:
JOHN JAMES,
AL WARD.

Copies of this patent may be obtained for five cents each, by addressing the "Commissioner of Patents, Washington, D. C."